United States Patent Office 3,493,662
Patented Feb. 3, 1970

3,493,662
NEMATOCIDAL METHODS EMPLOYING SUBSTITUTED DI-ARALKYL AMINES
Dieter Duerr, Bottmingen, Switzerland, assignor to Ciba Limited, Basel, Switzerland, a company of Switzerland
No Drawing. Filed Jan. 15, 1968, Ser. No. 697,608
Claims priority, application Switzerland, Jan. 17, 1967, 666/67
Int. Cl. A01n 9/20
U.S. Cl. 424—330    4 Claims

ABSTRACT OF THE DISCLOSURE

Preparations containing compounds of the formula

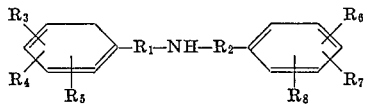

wherein $R_1$ and $R_2$ each represents an alkylene residue of at most 4 carbon atoms and $R_3$ to $R_8$ represent various substituents are used for combating different kinds of pests, preferably nematodes.

In addition to the active ingredients the preparations may contain carriers, additives or other pesticides.

---

The present invention relates to pesticidal preparations, especially preparations for combating plant-parasite nematodes, which comprise as active component, an active substance of formula

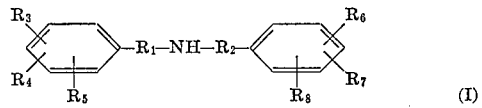

or an acid addition salt thereof, wherein $R_1$ and $R_2$ are identical or different and each represents an alkylene residue having 1–4 carbon atoms, $R_3$, $R_4$, $R_5$, $R_6$, $R_7$ and $R_8$ are identical or different and each denotes a hydrogen atom, a halogen atom, an alkyl, alkoxy, alkylthio, alkylsulphinyl or alkylsulphonyl group, a nitrile, nitro and/or a $CF_3$ group, together with a suitable carrier.

The preparations may contain one or more of the following additives: a solvent, a dispersing agent, an emulsifier, a binder, an adhesive, a thickener, as well as optionally further known pesticides, especially nematocides. In addition to the nematocidal effect, the active substances of Formula I are also effective against and plant-pathogenic fungi and bacteria, against representatives of the order Acarina, insects, water pests, for example algae and tubular worms, and against molluscs, especially gastropods. The active substances according to the invention may also be used for combating endoparasites, for example taenidea. The most diverse plant-pathogenic nematodes, for example, *Melodogyne arenaria*, Pratylenchus sp., *Ditylenchus dipsaci* and the like, may be combated with the preparations of the invention.

The preparations containing the compounds of Formula I used for combating nematodes, in accordance with the invention, may be employed in a solid form, for example, as a finely powdered dusting agent, or as granules, and furthermore also in a liquid form as an emulsion, suspension or solution. The chosen form in which the preparation is applied depends on the envisaged method of application, which in turn especially depends on the nature of the nematodes to be combated, the plant culture to be protected, the climate and the soil conditions as well as on the working technique. It is advantageous to distribute the active substance as uniformly as possible over a layer of soil at a depth of approximately 15 to 25 cm., and in order to achieve this the amount of active substance used is generally 5–250 kg./ha. However, it is also possible to use selective application methods, for example application of the active substance restricted to planting holes or seed fruits, and under certain circumstances this method provides adequate protective effect, while using a less active substance.

Dusting agents can be manufactured by mixing or jointly grinding the active substance with a solid pulverulent carrier which is insoluble, or sparingly soluble in water. As such carriers, there may for example be used: talc, diatomaceous earth, kieselguhr, kaolins, bentonites, calcium carbonate, boric acid or tricalcium phosphate. The active substance can also be applied to the carrier by making use of a volatile solvent. In order to manufacture scattering agents, it is possible either to use carriers which are inherently coarser-grained and/or of higher specific gravity, for example more coarsely ground limestone, sand and loess, or to granulate mixtures of the active substance with inherently finer-grained, optionally porous, carriers.

Furthermore, scattering agents may also contain, as carriers, solid substances of greater water-solubility, for example artificial fertilisers, for example digested calcium phosphates or other calcium, potassium or ammonium salts, loess, phosphates or nitrates in a coarser-grained, optionally granulated form. Emulsions according to the invention may be used both on unplanted fields and also, because of their penetrating power, in existing plant cultures. They are, for example, manufactured by dissolving the active substance in organic solvents, for example xylene, and emulsifying this solution in water containing a surface-active substance. In order to use the emulsions, it is in most cases advantageous in practice first to manufacture concentrates by combining the active substance with inert organic solvents and/or surface-active substances (emulsifiers), these concentrates in turn representing single-phase or multi-phase systems which can be converted to ready-to-use emulsions with water. Surface-active substances (emulsifiers) that may be used are both cationic substances, for example quaternary ammonium salts, anionic substances, for example, salts of aliphatic long-chain alkoxy-acetic acids and aliphatic-aromatic sulphonic acids, and nonionic surface-active substances, for example polyethylene glycol ethers of fatty alcohols or of dialkylphenols and polycondensation products of ethylene oxide with p-tert. hexylphenols, as well as amphoteric surface-active substances. Suitable solvents for the manufacture of emulsion concentrates are, for example, cyclic hydrocarbons for example benzene, toluene, xylene, ketones, alcohols and further solvents, for example ethyl acetate, dioxan, acetone glycerine or diacetone-alcohol.

Suspensions may be obtained by directly suspending the moist active substances in water, which optionally contains a surface-active substance, or by suspending wettable powders which are manufactured by mixing solid active substances with surface-active substances or with solid puverulent carriers and surface-active substances.

Especially suitable solvents for the active substances used in accordance with the invention are halogenated hydrocarbons having an intrinsic nematocidal effect, for example 1,2-dibromo-3-chloropropene, dichlorobutene or dichloropropane and dichloropropene mixtures, whose momentary nematocidal effect is supplemented in a valuable manner by the lasting effect of the active substances according to the invention.

The active substances of the invention do not have a phytotoxic effect when applied in the quantities used in practice, so that there is no harmful effect on plant growth. If desired, the biological activity of the preparations of the invention may be supplemented by adding fungicidal, herbicidal or insecticidal active substances or further nematocidal active substances.

In the following examples the first is intended to illustrate in more detail, the manufacture of the active substances used in the present invention. Further examples illustrate the test method used to determine the effectiveness and to illustrate the manufacture of some embodiments of the preparations according to the invention. In the examples, parts denote parts by weight.

EXAMPLE 1

The compounds of general Formula I are mostly described in the literature. They are manufactured by reacting the corresponding aralkyl halides with ammonia, for example in alcoholic solution. Reaction temperatures of 50–60° C. are generally sufficient.

The following compounds are manufactured in this manner:

As organic acids, acids which dissociate extensively are predominantly used, for example, methanesulphonic acid, benzenesulphonic acid, p-toluenesulphonic acid, ethionic acid, citric acid, methanephosphoric acid, maleic acid, benzoic acid, p-aminobenzoic acid, salicylic acid and phthalic acid.

A number of the above-mentioned compounds proved to be very active against various phytopathogenic fungi. Thus, for example, compounds Nos. 1, 3 and 5 at a dilution of 0.2% show a 60–80% protective effect against massive infections by Septoria.

EXAMPLE 2

20 parts of active substance No. 6 are dissolved in a mixture of 48 parts of diacetone-alcohol, 16 parts of xylene and 16 parts of an anhydrous high molecular condensation product of ethylene oxide with a mixture of higher fatty acids. This concentrate can be diluted with water to give nematocidal emulsions of any desired concentration.

| Compound No. | Formula | M.P. °C./B.P. °C./mm. Hg |
|---|---|---|
| 1 | Cl-C₆H₃(Cl)-CH₂-NH-CH₂-C₆H₃(Cl)-Cl | 168–172/0.15. |
| 2 | (CH₃)₂C₆H₃-CH₂-NH-CH₂-C₆H₃(CH₃)₂ | 127–128/0.15. |
| 3 | (OH)C₆H₄-CH₂-NH-CH₂-C₆H₄(OH) | 173–174 decomp. |
| 4 | CH₃-C₆H₃(CH₃)-CH₂-NH-CH₂-C₆H₃(CH₃)-CH₃ | 149/0.12. |
| 5 | Cl-C₆H₃(Cl)-CH₂-NH-CH₂-C₆H₃(Cl)-Cl | 190–195/0.06. |
| 6 | Cl-C₆H₄-CH₂-NH-CH₂-C₆H₄-Cl | M.P. 29–29.5° 153–158/0.1. |
| 7 | C₆H₃(Cl)(Cl)-CH₂-NH-CH₂-C₆H₃(Cl)(Cl) | 200/0.2. |
| 8 | Cl-C₆H₃(Cl)-CH₂-CH₂-NH-CH₂-CH₂-C₆H₃(Cl)-Cl | HCl-Salt 209–210. |
| 9 | C₆H₃(Cl)(Cl)-CH₂-CH₂-NH-CH₂-CH₂-C₆H₃(Cl)(Cl) | 103. |

The bis-aralkylamines obtained may also be converted to their acid addition salts and may also be used in this form. Inorganic and organic acids are suitable for the salt formation.

As inorganic acids there may be mentioned: hydrochloric acid, sulphuric acid, phosphoric acid and sulphamic acid.

EXAMPLE 3

80 parts of the active substance No. 6 are mixed with 2–4 parts of a wetting agent, for example the sodium salt of an alkylpolyglycol-ether-monosulphate, 1–3 parts of a protective colloid, for example sulphite waste lye and 15 parts of an inert solid carrier, for example kaolin, bentonite, chalk or kieselguhr and thereafter finely ground in a suitable mill. The resulting wettable powder yields a very stable nematocidal suspension, if stirred with water.

EXAMPLE 4

5 parts by weight of active substance No. 6 are mixed with 95 parts by weight of calcium carbonate and ground. The product is used as a nematocidal scattering agent.

EXAMPLE 5

5 parts by weight of one of the active substances specified in the above examples or of another active substance of general Formula I are mixed with 95 parts by weight of a pulverulent carrier, for example, sand or calcium carbonate, and moistened with 1–5 parts by weight of water or isopropanol. Thereafter, the mixture is granulated. Before granulation, several times the amount, for example 100–900 parts, of an optionally water-soluble artificial fertiliser, for example ammonium sulphate, may be mixed with the above mixture or with a mixture which is richer in active substance, for example containing 10 parts of active substance and 90 parts of calcium carbonate.

EXAMPLE 6

20 parts of the active substance and 80 parts of talc are ground in a ball mill to maximum fineness. The resulting mixture serves as a nematocidal dusting agent.

EXAMPLE 7

A water-emulsifiable solution exerting a nematocidal effect is obtained by mixing 50 parts of one of the active substances specified in the above examples or of another active substance of Formula I, 45 parts of xylene, 2.5 parts of an ethylene oxide condensation product of an alkylphenol and 2.5 parts of a mixture of the sodium salts of dodecyl-oxyethyl-sulphuric acid.

EXAMPLE 8

In order to test the nematocidal effect in vitro, the active substances of Formula I are formulated as follows: the active substance is dissolved in a little acetone with the addition of an emulsifier, for example polyoxyethylenesorbitol-monooleate, and the desired dilutions are manufactured therefrom by addition of well-aerated water.

The nematocidal effect is tested as follows: 5 litre flasks are two-thirds filled with very well washed quartz sand. 1 cc. of the solution to be investigated is then added and the flasks are very vigorously stirred in order to mix the contents thoroughly. About 100 nematodes (*Panagrellus redivivus*) are then put into each flask, and after replacing the closure the batch is again shaken and then allowed to stand for 48 hours. The mortality of the nematodes is then counted. Each concentration was repeated four times.

Dichloropropane/dichloropropene mixture (D.D.) served as the comparison substance.

The following results were obtained.

| Concentration of the active substance, in p.p.m. No. 6— | Mortality in percent |
|---|---|
| 25 | 91 |
| 100 | 100 |
| D.D., 25 | 85 |

Other compounds falling within the general Formula I showed a similar activity.

What is claimed is:

1. A method of combating plant-parasite nematodes, wherein there is applied to the plants a preparation comprising a nematocidally effective amount of a compound selected from the group consisting of the compound of the formula

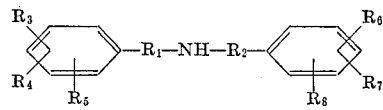

and the acid addition salts thereof, wherein $R_1$ and $R_2$ are identical or different and each denotes an alkylene residue having 1 to 4 carbon atoms, $R_3$, $R_4$, $R_5$, $R_6$, $R_7$ and $R_8$ are identical or different and each represents a member selected from the group consisting of hydrogen, halogen, lower alkyl, and hydroxyl, at least one of the substituents $R_3$ to $R_8$ being other than hydrogen on each phenyl nuclei.

2. A method of combating plant-parasite nematodes, wherein there is applied to soil a preparation comprising a nematocidally effective amount of a compound selected from the group consisting of the compound of the formula

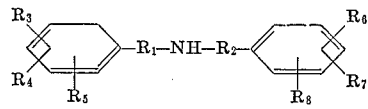

and the acid addition salts thereof, wherein $R_1$ and $R_2$ are identical or different and each denotes an alkylene residue having 1 to 4 carbon atoms, $R_3$, $R_4$, $R_5$, $R_6$, $R_7$ and $R_8$ are identical or different and each represents a member selected from the group consisting of hydrogen, halogen, lower alkyl, and hydroxyl, at least one of the substituents $R_3$ to $R_8$ being other than hydrogen on each phenyl nuclei.

3. The method according to claim 2, wherein the preparation is distributed in a layer of soil to a depth of 15 to 25 cm.

4. The method according to claim 3, wherein said preparation is applied to the soil such that 5 to 250 kg./ha. of active substance is distributed in the soil.

References Cited

Chem. Abstracts, Brun et al., vol. 51, p. 2222e, 1957.

ALBERT T. MEYERS, Primary Examiner

VINCENT D. TURNER, Assistant Examiner

UNITED STATES PATENT OFFICE
CERTIFICATE OF CORRECTION

PO-1050 (5/69)     CASE 6098/E

Patent No. 3,493,662     Dated February 3, 1970

Inventor(s) DIETER DUERR

It is certified that error appears in the above-identified patent and that said Letters Patent are hereby corrected as shown below:

Column 6, lines 36-39, amend the left hand side of the formula to read:

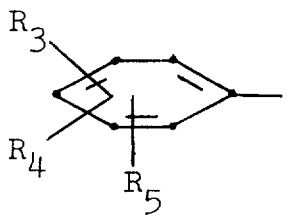

SIGNED AND SEALED
FEB 9 1971

(SEAL)
Attest:

Edward M. Fletcher, Jr.
Attesting Officer

WILLIAM E. SCHUYLER, JR.
Commissioner of Patents